US008520306B2

(12) United States Patent
Varnham et al.

(10) Patent No.: US 8,520,306 B2
(45) Date of Patent: Aug. 27, 2013

(54) APPARATUS FOR COMBINING LASER RADIATION

(75) Inventors: Malcolm Paul Varnham, Alresford (GB); Mikhail Nickolaos Zervas, Southampton (GB); Fabio Ghiringhelli, Southampton (GB); Andrew Thomas Harker, Ipswich (GB)

(73) Assignee: SPI Lasers UK Ltd, Tollbar Way, Southampton (GB)

( * ) Notice: Subject to any disclaimer, the term of this patent is extended or adjusted under 35 U.S.C. 154(b) by 152 days.

(21) Appl. No.: 12/998,438

(22) PCT Filed: Oct. 23, 2009

(86) PCT No.: PCT/GB2009/002534
§ 371 (c)(1),
(2), (4) Date: Apr. 20, 2011

(87) PCT Pub. No.: WO2010/046661
PCT Pub. Date: Apr. 29, 2010

(65) Prior Publication Data
US 2011/0194166 A1      Aug. 11, 2011

(30) Foreign Application Priority Data

Oct. 24, 2008 (GB) .................................. 0819578.6
Oct. 27, 2008 (GB) .................................. 0819702.2

(51) Int. Cl.
*G02B 27/10* (2006.01)
*G02F 1/01* (2006.01)

(52) U.S. Cl.
USPC ........... 359/618; 359/279; 359/276; 359/238; 359/325; 359/334; 359/349; 372/9; 372/31; 372/29.023; 250/201.9

(58) Field of Classification Search
USPC ................. 359/237, 238, 276, 279, 618, 325, 359/333, 334, 337.22, 341.1, 349; 372/9, 372/20, 22, 25, 29.023, 31, 32, 55, 57, 69, 372/98; 398/102, 185, 210; 250/201.9
See application file for complete search history.

(56) References Cited

U.S. PATENT DOCUMENTS 3,453,559 A * 7/1969 Sharp et al. ..................... 372/9
4,847,477 A * 7/1989 Smith ........................ 250/201.9
(Continued)

FOREIGN PATENT DOCUMENTS

| EP | 1041686 | 10/2000 |
|---|---|---|
| WO | WO 2007/034317 | 3/2007 |

OTHER PUBLICATIONS

Augst, S.J. et al: "Coherent Beam Combing and Phase Noise Measurements of Ytterbium Fiber Amplifiers", Optics Letters, OSA, Optical Society of America, Washington D.C, US, Mar. 1, 2004, vol. 29, No. 5, pp. 474-476.

*Primary Examiner* — Loha Ben
(74) *Attorney, Agent, or Firm* — Iandiorio Teska & Coleman LLP

(57) ABSTRACT

Apparatus for combining laser radiation (1) 5 which apparatus comprises a seed laser (2), a splitter (3), a plurality of amplifier chains (4), a reference amplifier chain (7), detection means (5). demodulator means (6), and phase control means (12), wherein each of the amplifier chains (4) comprises at least one optical amplifier (11), optical radiation (17) emitted from the seed laser (2) is split into the plurality of amplifier chains (4) by the splitter (3). amplified by the plurality of amplifier chains (4), interfered, detected by the detection means (5), demodulated by the demodulator means (6), and a signal (27) indicative of path length imbalance (14) fed back to the phase control means (12), and wherein the apparatus is characterized in that the output power emitted by each amplifier chain (4) is at least 50 W, the bandwidth (8) of the seed laser (2) is at least 1 GHz, and the path length difference (14) between each amplifier chain (4) and the reference amplifier chain (7) is less than the coherence length (10) of the seed laser (2).

28 Claims, 6 Drawing Sheets

(56) References Cited

U.S. PATENT DOCUMENTS

| | | |
|---|---|---|
| 6,678,294 B1 | 1/2004 | Komine et al. |
| 7,171,129 B1 * | 1/2007 | Blair et al. .................... 398/203 |
| 7,884,997 B2 * | 2/2011 | Goodno ........................ 359/349 |
| 2008/0253417 A1 | 10/2008 | Livingston |

* cited by examiner

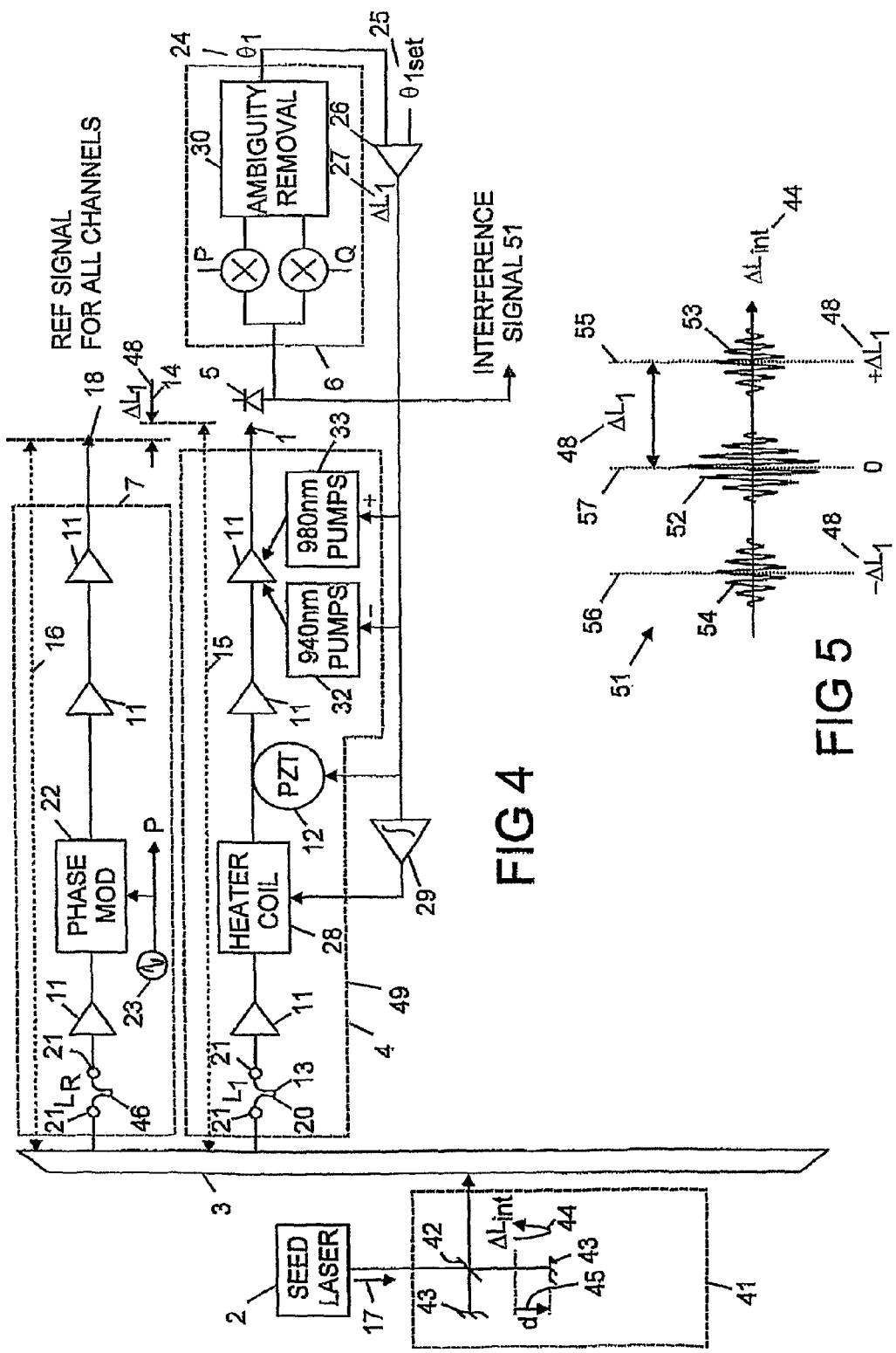

APPARATUS FOR COMBINING LASER RADIATION

FIELD OF INVENTION

This invention relates to apparatus for combining laser radiation.

BACKGROUND TO THE INVENTION

Diode-pumped fibre lasers have become commercially available over the last few years that can emit several hundred watts of laser radiation in a near diffraction limited beam. These lasers are based on rare-earth doped optical fibres which emit mainly in the fundamental mode. The optical fibres are typically based on large mode area fibres such as those described in U.S. Pat. No. 6,614,975. The large mode area enables the power levels to be increased to levels which would cause optical damage, as well as non-linear effects such as stimulated Raman scattering and stimulated Brillouin scattering, if a truly single mode core were used.

Further increases in the output power can be achieved by combining single-mode laser radiation from several rare-earth doped fibres together. The laser radiation can be combined incoherently (by using wavelength division multiplexing) or coherently.

Coherent combining requires the laser radiation emitted from each rare-earth doped fibre to be coherent, single mode, and aligned in its state of polarisation.

Coherent combination schemes include master oscillator power amplifier (MOPA) designs in which laser radiation from a single master oscillator (or seed laser) is divided into parallel channels, and amplified by amplifier chains. These amplifier chains typically contain several preamplifiers and power amplifiers, each amplifier comprising several meters to several tens of meters of fibre. The length of each chain needs to be balanced to within the coherence length of the laser radiation emitted by the seed laser. Preferably, the balancing requirement is to within one third or even one tenth of the coherence length. Thus the simplest schemes use seed lasers that have long coherence lengths in order to make the balancing easier.

The power emitted by a coherently combined MOPA system can be increased by either increasing the power emitted by each MOPA chain, or by increasing the number of MOPA chains that are combined together. The power emitted by each MOPA chain is in practice limited by non-linear effects such as stimulated Brillouin scattering (SBS), which has a threshold in a typical system of around 100 W, which can be increased to several hundred watts or higher by broadening mechanisms, such as line broadening, thermal broadening, material broadening and using a seed with a broader linewidth. Using a seed laser with a broader linewidth shortens the coherence length of the laser radiation. However, if stimulated Brillouin scattering occurs, it can lead to undesired pulsing of the laser, and very fast almost instantaneous catastrophic damage.

Increasing the linewidth of the seed laser is very desirable in order to increase the power level at which SBS becomes noticeable (the so-called SBS threshold). However, as the linewidth increases, the coherence length decreases, and the balancing requirement becomes more difficult. The amplifiers therefore have to be built to exacting tolerances. This is difficult, especially when the need for maintenance and replacement of amplifiers is taken into account. The amplifiers are preferably spliced together, a process that involves cleaving the fibres (often more than once to ensure perfect end faces) and splicing them together in a commercial fusion splicer, often in the field (as opposed to an air-conditioned clean room).

SBS is characterized by a frequency shift between the forward propagating pump wave and the backward travelling wave. The frequency shift at a pump wavelength of around 1 μm is typically around 10 GHz to 17 GHz in silica optical fibres, the variation being dependent upon dopants and whether the fibre has a solid uniform or non-uniform core or is microstructured. The bandwidth of the Brillouin gain is in the range 35 MHz to 100 MHz. This bandwidth corresponds to the lifetime of the acoustic phonon that is generated in the spontaneous Brillouin scattering process. This bandwidth corresponds to an effective Brillouin scattering length $L_B$ of optical fibre of around 6 m to 2 m.

A problem that can occur in high power lasers and amplifiers is when the SBS threshold at a particular power is reached in an effective gain length. $L_G$ comparable to or less than $L_B$. For example, for a 1 kW signal, the effective gain length may be of the order of 20 mm. For the linewidth broadening approach, this would require a linewidth many times the Brillouin bandwidth. This would further increase the difficulty of balancing the MOPA chains.

There is therefore a need for a MOPA architecture which eases the requirements for maintenance and repair, and which permits seed lasers having shorter coherence lengths to be used.

An aim of the present invention is to provide an apparatus for combining laser radiation which reduces the above aforementioned problem.

The Invention:

According to a non-limiting embodiment of the invention, there is provided apparatus for combining laser radiation, which apparatus comprises a seed laser, a splitter, a plurality of amplifier chains, a reference amplifier chain, detection means, demodulator means, and phase control means, wherein each of the amplifier chains comprises at least one optical amplifier, optical radiation emitted from the seed laser is split into the plurality of amplifier chains by the splitter, amplified by the plurality of amplifier chains, interfered, detected by the detection means, demodulated by the demodulator means, and signals indicative of path length imbalance fed back to the phase control means, and wherein the apparatus is characterised in that the output power emitted by each amplifier chain is at least 50 W, the bandwidth of the seed laser is at least 1 GHz, and the path length difference between each amplifier chain and the reference amplifier chain is less than the coherence length of the seed laser.

The apparatus may include at least one path length balance means for balancing the path length difference between at least one of the amplifier chains and the reference amplifier chain to within the coherence length of the seed laser. The path length balance means may comprise a length of optical fibre.

The phase control means may comprise a length of optical fibre that is heated. The length of optical fibre may be an amplifying fibre within at least one of the amplifier chains.

The phase control means may utilize the quantum defect in an optical fibre amplifier. The phase control means may be based upon varying the relative proportions of pump power emitted by a longer wavelength pump and a shorter wavelength pump. The phase control means may utilize an additional signal wavelength that is different from the signal wavelength emitted by the seed laser.

The path length difference between each of the plurality of amplifier chains and the reference amplifier chain may be measured by physical length measurements. The path length difference may be measured using optical methods. The path length difference may be measured by inserting a scanning interferometer between the seed laser and the splitter, scanning the interferometer, and analysing the response of the detection means. The path length difference may be measured by measuring the phase excursions of each of the plurality of amplifier chains following application of a phase angle stimulus. The phase angle stimulus may be achieved by turning the apparatus on. The phase angle stimulus may be achieved by chirping the seed laser. The optical path length of the reference amplifier chain may be changed prior to the application of the phase angle stimulus.

The phase control means may include a controller that comprises memory for dynamic balancing of the path length imbalance.

The seed laser may comprise a narrow linewidth laser and a modulator comprising at least one phase modulator. The modulator may be driven with a periodic signal. The modulator may be driven with a random or a pseudo-random signal having a bandwidth less than the stimulated Brillouin frequency shift $F_{SBS}$. The periodic signal may comprise a sinusoidal, a triangular, a saw tooth, or a square waveform. The periodic signal may comprise a parabolic waveform. The frequency of the periodic signal may be greater than the Brillouin bandwidth. The amplitude of the periodic signal may be greater than $\pi$ radians. The amplitude may be greater than $10\pi$ radians. The product of the amplitude and the frequency of the periodic signal may be greater than 1 GHz. The product of the amplitude and the frequency may be less than the stimulated Brillouin frequency shift $F_{SBS}$.

The modulator may be driven with a second periodic signal having a frequency greater than the stimulated Brillouin frequency shift $F_{SBS}$. The frequency of the second periodic signal may be more than approximately twice the stimulated Brillouin frequency shift $F_{SBS}$. The second periodic signal may be a phase shift keying (PSK) signal.

The modulator may be driven with a phase shift keying (PSK) signal.

The modulator may be driven with a continuous phase frequency shift keying (CPFSK) signal.

At least one of the amplifier chains may be characterised by an effective gain length $L_G$ and an effective Brillouin scattering length $L_B$, and the optical power emitted by the amplifier chain may be such that the effective Brillouin gain length $L_G$ is comparable or less than the effective Brillouin scattering length $L_B$.

The periodic signal may be characterized by a wavelength, and the wavelength of the periodic signal may be less than the effective Brillouin gain length $L_G$. The wavelength may be less than one ball of the effective Brillouin gain length $L_G$.

According to another non-limiting embodiment of the invention, there is provided a method of balancing the apparatus of the invention, the method comprising applying a phase angle stimulus, and measuring the path length, imbalance between at least one of the amplifier chains and the reference amplifier chain from the signal indicative of path length imbalance. The method may comprise the additional step of misbalancing the reference amplifier chain. Alternatively or additionally, the method may comprise the additional step of misbalancing at least one of the amplifier chains.

According to another non-limiting embodiment of the invention, there is provided a method of balancing the apparatus of the invention, which method comprises providing an interferometer, inserting the interferometer between the seed laser and the splitter, scanning the interferometer, and measuring the path length imbalance between at least one of the amplifier chains and the reference amplifier chain from the signal indicative of path length imbalance. The method may comprise the additional step of misbalancing the reference amplifier chain. Alternatively or additionally, the method may comprise the additional step of misbalancing at least one of the amplifier chains.

BRIEF DESCRIPTION OF THE DRAWINGS

Embodiments of the invention will now be described solely by way of example and with reference to the accompanying drawings in which:

FIG. 4 shows apparatus including an interferometer for measuring the path length difference;

FIG. 5 shows interference signals obtained whilst scanning the interferometer;

DETAILED DESCRIPTION OF PREFERRED EMBODIMENTS OF THE INVENTION

Figure 1:
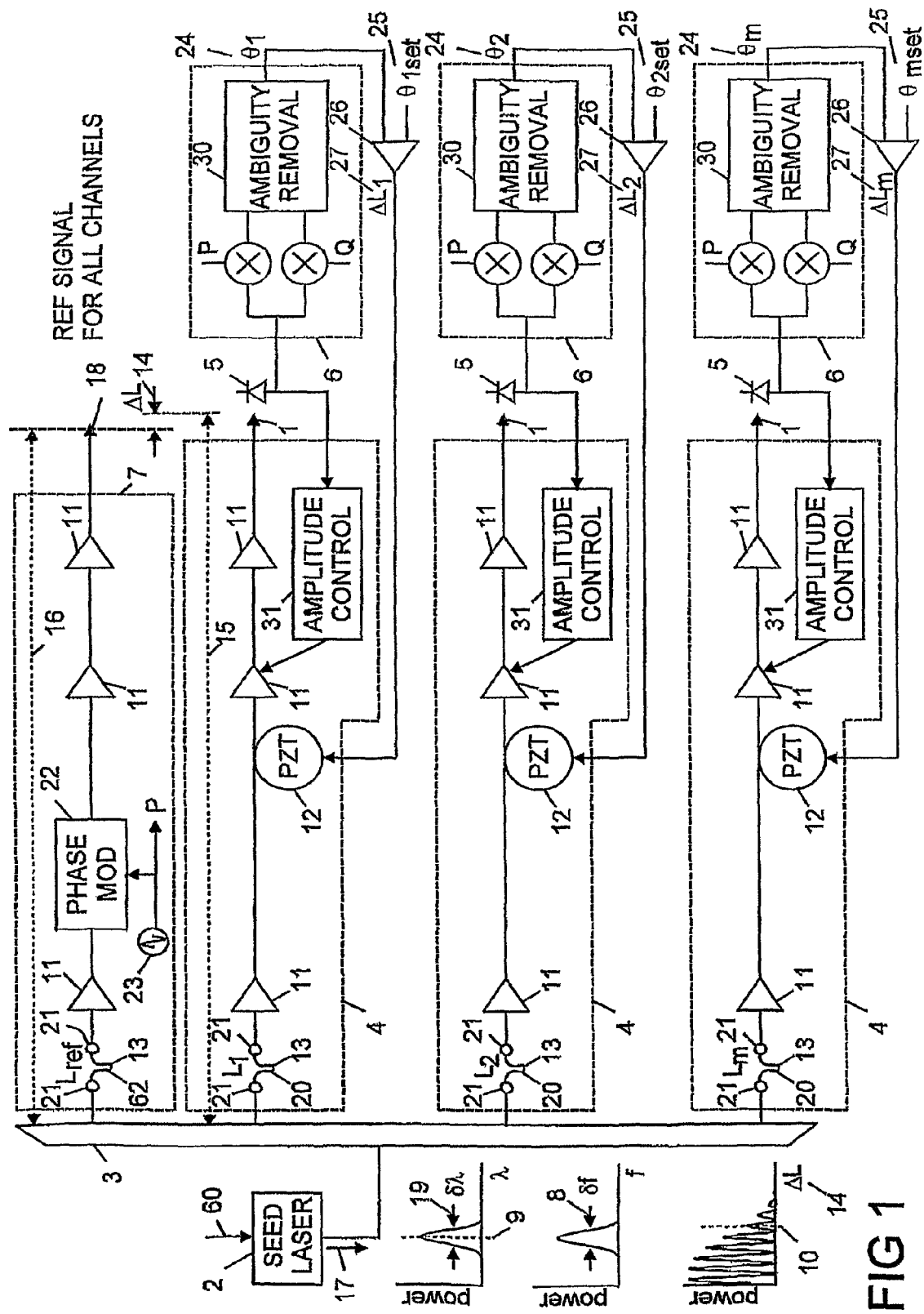
FIG. 1 shows apparatus for combining laser radiation according to the present invention.

With reference to FIG. 1, there is provided apparatus for combining laser radiation 1, which apparatus comprises a seed laser 2, a splitter 3, a plurality of amplifier chains 4, a reference amplifier chain 7, detection means 5, demodulator means 6, and phase control means 12, wherein each of the amplifier chains 4 comprises at least one optical amplifier 11, optical radiation 17 emitted from the seed laser 2 is split into the plurality of amplifier chains 4 by the splitter 3, amplified by the plurality of amplifier chains 4, interfered, detected by the detection means 5, demodulated by the demodulator means 6, and a signal 27 indicative of path length difference 14 fed back to the phase control means 12, and wherein the apparatus is characterised in that the output power emitted by each amplifier chain 4 is at least 50 W, the bandwidth 8 of the seed laser 2 is at least 1 GHz, and the path length difference 14 between each amplifier chain 4 and the reference amplifier chain 7 is less than the coherence length 10 of the seed laser 2.

The apparatus can include at least one path length balance means 13 for balancing the path length difference 14 between at least one of the amplifier 4 and the reference amplifier chain 7 to within the coherence length 10 of the seed laser 2. The path length balance means 13 can comprise optical fibre 20. The optical fibre 20 can be in the form of a patch lead with at least one optical fibre connector 21.

The apparatus of FIG. 1 has "m" amplifier chains 4 (only amplifier chain 1, 2 and m are shown for clarity) together with the reference amplifier chain 7. A typical system may have 5 to 100 amplifier chains 4, each emitting laser radiation 1 of between 50 W to 1000 W, or even higher powers up to 10,000 W or higher. Each of the amplifier chains 4 is shown has having various stages of amplification provided by the amplifiers 11. The amplifiers 11 are preferably optical fibre amplifiers. The optical fibre amplifiers may be cladding or core pumped, and may be end pumped or side pumped. By feeding back the signal 27 from each of the demodulator means 6 to their respective phase control means 12, it is possible to lock the relative phases of the laser radiation 1 emitted from each of the amplifier chains 4 and thus provide a coherently combined signal of very high beam quality. The apparatus can be used to lock the relative phases to within a fraction of a wavelength, although each path length difference 14 would in general have an offset of many tens if not hundreds of wavelengths.

The detection means 6 may be an optical detector, for example a silicon photodiode. The detector would typically be used in combination with an amplifier.

Stimulated Brillouin Scattering (SBS) provides an important practical limitation to the power attainable from each of the amplifier chains 4. Optical radiation scattered backwards (that is, in the opposite direction to the signal light) along the fibres within the amplifier chains 4 is amplified strongly when the power increases above the SBS threshold. This can result in permanent damage to the fibres, and can reduce the cores of sections of the optical fibre to glass powder. The broader the bandwidth 8 of the seed laser 2, the higher the SBS threshold, and the higher the power that can be attained from each amplifier chain 4 before the onset of SBS. However, as the bandwidth 8 increases, the coherence length 10 reduces, and this can make balancing the lengths of the amplifier chains 4 such that the path length difference 14 is less than the coherence length 10 more difficult. Techniques for balancing the amplifier chains 4 should therefore be seen as being of paramount importance, not only for the initial manufacture of the apparatus, but also for repair and maintenance. When amplifiers 11 are replaced or repaired, it is essential that the respective amplifier chain 4 is rebalanced. This is an important and practical aspect of the overall system design.

As shown with reference to FIG. 1, the bandwidth δf 8 of the seed laser 2 can be expressed in wavelength terms as a spectral bandwidth δλ 19. The spectral bandwidth 19 is preferably greater than 0.1 nm. This is advantageous in order to increase the SBS threshold 96 (shown with reference to FIG. 9) and thus increase the power of the laser radiation 1 attainable from each of the amplifier chains 4. More preferably, the spectral bandwidth 19 is greater than 0.3 nm, and can be as great as 1 nm. However the greater the spectral bandwidth 19, the more difficult it is to balance the amplifier chains 4.

Table I shows the dependence of the coherence length δL 10 (in air) on the bandwidth δf 8 of the seed laser 2 for a central wavelength 9 of 1 μm and a central wavelength 9 of 1.5 μm. The corresponding spectral bandwidths δλ 19 at central wavelengths 9 of 1 μm and 1.5 μm are also stated. These were calculated using the following formula:

$$\delta\lambda = \delta f \cdot \lambda^2/c$$

where λ is the central wavelength 9, δλ is the spectral bandwidth 19, δf is the bandwidth 8 expressed in frequency f, and c is the speed of light in vacuum.

TABLE I

Bandwidth and Coherence Lengths (in air) at wavelengths of 1 μm and 1.5 μm.

| Bandwidth 8 in Frequency Domain Δf | Coherence Length 10 (in air) δL = c/δf | Spectral Bandwidth 19 at 1 μm δλ = δf · λ²/c | Spectral Bandwidth 19 at 1.5 μm Δλ = δf · λ²/c |
|---|---|---|---|
| 30 kHz | 10 km | 0.0001 pm | 0.000225 pm |
| 300 kHz | 1 km | 0.001 pm | 0.00225 pm |
| 3 MHz | 100 m | 0.01 pm | 0.0225 pm |
| 30 MHz | 10 m | 0.1 pm | 0.225 pm |
| 300 MHz | 1 m | 1 pm | 2.25 pm |
| 3 GHz | 100 mm | 0.01 nm | 0.0225 nm |
| 30 GHz | 10 mm | 0.1 nm | 0.225 nm |
| 300 GHz | 1 mm | 1 nm | 2.25 nm |
| 3000 GHz | 0.1 mm | 10 nm | 22.5 nm |

The bandwidth 95 of the Brillouin gain 94 (shown with reference to FIG. 9) is in the range 35 MHz to 100 MHz. The bandwidth 95 of the Brillouin gain 94 corresponds to the lifetime of the acoustic phonon 83 (shown with reference to FIG. 8) associated with the spontaneous Brillouin scattering process.

Referring to FIG. 1, it is desirable that the bandwidth δf 8 is substantially greater than the bandwidth 95 of the Brillouin gain 94. Preferably, the bandwidth δf 8 should be greater than approximately 3 GHz, and more preferably greater than approximately 30 GHz. The corresponding coherence lengths 10 are 10 mm and 1 mm (in air) respectively. However, to ensure that the visibility of the fringes is approximately maximised, it is beneficial to balance the amplifier chains 4 to well within the corresponding coherence lengths 10. This also helps to reduce phase noise (and hence pointing accuracy in a directed energy laser) once the laser radiation 1 has been combined. Hence it is preferable that the path length difference 14 is less than approximately one third of the coherence length 10 of the seed laser 2. It is more preferable that the path length difference 14 is less than approximately one tenth of the coherence length 10 of the seed laser 2. With reference to Table I, and in consideration of the preferred values of the bandwidth δf 8 of greater than 3 GHz and more preferably greater than 30 GHz, it can be seen that path length difference 14 is preferably less than approximately 33 mm (that is one third of 100 mm), and more preferably less than approximately 1 mm (that is one tenth of 10 mm). This requirement has hitherto been difficult to satisfy in practice. Note that the path length difference 14 referred to above is the path length difference in air. The path length differences quoted need to be divided by the refractive index of the glass (approximately 1.458 for silica) when referring to the length of optical fibre that corresponds to a given path length difference or coherence length.

The wavelengths selected in Table I were chosen because they are important wavelengths for high power fibre lasers and amplifiers. Ytterbium-doped fibre lasers and amplifiers emit at around 1 μm (typically 1.06 μm to 1.09 μm), and Erbium-doped fibre lasers and amplifiers emit at around 1.5 μm (typically around 1.53 to 1.56 μm). Other important rare earth dopants include Erbium co-doped with Ytterbium (emitting at around 1.56 μm) and Thulium (emitting at around 2 μm).

The path length balance means 13 can comprise lengths $L_i$ of optical fibre 20 inserted into each of the amplifier chains 4. Alternatively or additionally, it may also comprise a length $L_{ref}$ of optical fibre 62 inserted into the reference amplifier chain 7. The lengths $L_{ref}$ and the $L_i$ are selected such that the respective amplifier chains 4 are balanced to the desired accuracy as detailed above. The optical fibres 20 can be fusion spliced to the fibres of the respective amplifier chains 4, or can be a patch lead which is connected to the fibres of the amplifier chain 4 using optical fibre connectors 21. The optical fibres 20 are preferably positioned at the input end of the amplifier chains 4 because it is easier to make a low power connection or splice than it is to make a higher power connection or splice. Alternatively or additionally, the path length balance means 13 can comprise a length of optical fibre that is cleaved from the system in order to balance the lengths of the amplifier chains 4.

The phase control means 12 can comprise a phase modulator such as a Lithium Niobate modulator, an electro-optic modulator, or an acousto-optic modulator. The phase control means 12 is shown in FIG. 1 as comprising a lead zirconate titanate (PZT) modulator. A PZT modulator comprises an optical fibre wound around a PZT coil. The PZT coil can be stretched by applying an electrical signal, and can also be modulated by applying a time varying signal to the PZT, which modulation applies a phase modulation to light propagating along the optical fibre.

The reference amplifier chain 7 includes a phase modulation means 22, which can be a phase modulator such as a Lithium Niobate modulator, an electro-optic modulator, an acousto-optic modulator, or a phase modulator. The phase modulation means 22 is modulated with a time varying signal from an oscillator 23, which is preferably a sinusoidal, triangular, or square-wave time varying signal. This modulation induces a phase modulation on the laser radiation 18 propagating through the reference amplifier chain 7, which upon interference with the laser radiation 1 emitted from each of the amplifier chains 4, causes a time varying signal on each of the detection means 5. The detection means 5 comprises a detector which emits a detected electrical signal. The detected signal is then demodulated by the demodulator means 6 which may be a phase angle demodulator. The demodulator means 6 outputs a phase angle $\theta_i$ 24, where the subscript "i" refers to the "$i^{th}$" amplifier chain 4. Thus the phase angle $\theta_1$ 24 is the phase angle output from the demodulator means 6 of the $1^{st}$ amplifier chain 4, the phase angle $\theta_2$ 24 is the phase angle output from the demodulator means 6 of the $2^{nd}$ amplifier chain 4, and so on. The demodulator means 6 may be one that demodulates the detected signal with respect to in-phase and quadrature signals P, Q with respect to the time varying signal from the oscillator 23. Preferably the demodulation means 6 includes ambiguity removal 30 (sometimes referred to as phase unwrapping) which can comprise an electronic circuit (or computer program) which removes the $\pi$ or $2\pi$ ambiguities often associated with phase angle demodulators, such that once phase locked, the feedback to the phase control means 12 can be used to maintain phase lock over several if not many interference fringes. Each phase angle $\theta_i$ 24 is then compared to a desired phase angle $\theta_{iset}$ 25 in a controller 26 in order to generate the signal 27 which is fed back to the phase control means 12. Thus the phase angle $\theta_1$ 24 output from the demodulator means 6 of the $1^{st}$ amplifier chain 4 is compared with the desired phase angle $\theta_{1set}$ 25 in the controller 26, the phase angle $\theta_2$ 24 output from the demodulator means 6 of the $2^{nd}$ amplifier chain 4 is compared with the desired phase angle $\theta_{2set}$ 25 in the controller 26, and so on for each of the "m" amplifier chains 4. In FIG. 1, the phase control means 12 is shown as a PZT coil comprising a PZT cylinder around which a length of fibre is wound. The PZT coil changes the fibre length to stabilize and control the output phase angle $\theta_i$ 24 of the $i^{th}$ amplifier chain to the desired set point $\theta_{iset}$ 25. The desired set points $\theta_{iset}$ 25 in the m amplifier chains 4 may each be zero. The controller 26 can comprise at least one of an electronic amplifier, a comparator, or a computer control system. Examples of demodulation schemes and fibre optic interferometers can be found in U.S. Pat. Nos. 4,632,551, 4,836,676, 5,131,749, 5,991,026, 6,363,034, which patents are hereby incorporated herein by reference. Alternatively or additionally, the time varying signal from the oscillator 23 can be applied to one or more of the phase control means 12 in order to provide the detected signal for locking the phases. Alternatively or additionally, the phase modulation means 22 may comprise a frequency shifter such as an acousto-optic modulator or integrated optic frequency shifter. The detected signal from the detection means 5 would then comprise a phase modulated bandpass signal centred on the frequency shift induced by the frequency shifter. Demodulation techniques using such a bandpass approach are described in U.S. Pat. No. 6,363,034.

The output of the detection means 5 is also shown as feeding back to an amplitude control 31. This is a device that controls the amplitude of laser radiation 1, which can be achieved by controlling the pump power within at least one of the amplifiers 11. For optical fibre amplifiers, the amplitude control 31 would preferably control the power emitted by pump diodes. Preferably, the amplifier 11 that is controlled would not be the final amplifier in the amplifier chain 4. This is to avoid unintentional phase modulation of the output from the final amplifier. The amplitude control loop is not shown in FIGS. 2 and 3, but may be included within these embodiments.

A limitation of implementing the phase control means 12 with phase modulators alone, is that PZT coils and most other phase modulators provide relatively little maximum steady-state phase shift (say for example ±5 fringes). Phase modulators can provide very rapid response, but have relatively low dynamic range.

Figure 2:
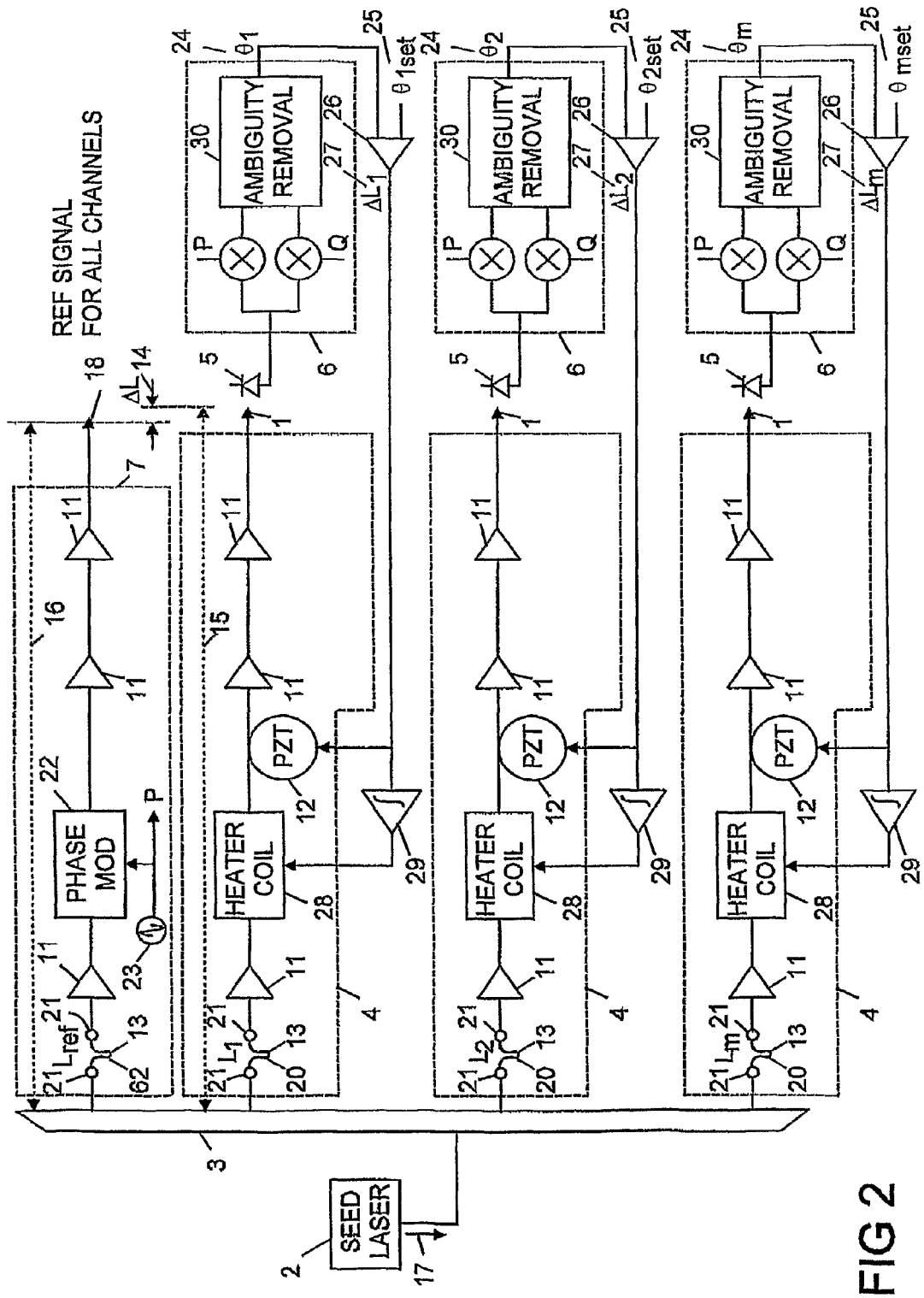
FIG. 2 shows apparatus including a heater coil for increasing dynamic range.

The dynamic range can be increased, as shown with reference to FIG. 2, using a heater coil 28 comprising a length of optical fibre and a heater. The output of the controller 26 is used to control the heater coil 28, preferably after further electronic amplification by an amplifier 29. Preferably the amplifier 29 is an electronic integrator in order to provide integral control. This is useful because the integrator will output a steady state signal when the error signal 27 fed back from the controller 26 is zero. Combining a slow feedback mechanism with wide dynamic range via the heater coil 28 with a rapid feedback mechanism via the phase control means 12 enables rapid control of phase errors whilst enabling the optical path lengths 15 to be increased over many fringes, particularly during temperature ramps when the amplifiers 11 are turned on.

Taking for example, a 100° C. temperature rise of the core, and a 20 m amplifier positioned as the final amplifier 11 in the amplifier chain 4, the increase in optical path length nL will be:

$$\Delta n \cdot L \sim 10^{-5} \times 1.5 \times 100 \times 20 = 30 \text{ mm}$$

If the laser radiation 1 propagating in the optical fibres of the amplifier chains 4 has a free-space wavelength of 1 μm, then the increase in the optical path length 15 of 30 mm would therefore correspond to approximately 30,000 wavelengths. This is a very large change in the path length 15. To avoid the amplifier chain 4 from misbalancing with respect to the reference amplifier chain 7, it is desirable to use as many common components (such as the amplifiers 11) as possible in both the amplifier chain 4 and the reference amplifier chain 7, and to operate these as far as possible in substantially the same thermal environment. Thus although the reference amplifier chain 7 may not include the amplifiers 11, it is preferable that it does include the amplifiers 11 as shown in FIGS. 1 to 4. Nevertheless, with such a large change in the path length 15, it remains very difficult to increase the bandwidth 8 of the seed laser 2 whilst still achieving coherent combination. The balancing methods described below thus have great significance in providing a practical solution to achieving balanced operation with larger seed laser 2 linewidth, essential for utilizing SBS broadening mechanisms to increase the SBS threshold.

Misbalance of the amplifier chains 4 will lead to: increased phase noise (pointing noise or increased divergence in the final system); potential loss of amplitude in certain amplifier chains 4; and risk of losing phase lock As a result of the above, misbalanced amplifier chains 4 will put pressure on the system design to increase the coherence length 10 of the seed laser 2, which in turn increases non-linear effects (such as stimulated Raman and Brillouin scattering) in the system. Provision of the heater coil 28 in combination with the phase control means 12 in the form of a PZT coil provides a wider dynamic range than is possible with the PZT coil alone. Also, provision of optical fibres 20 which may be patch leads to balance the individual amplifier chains 4, which optical fibres 20 are positioned at a location where the optical signals are relatively weak, enables the system to be set up, maintained, and repaired (including the replacement and cleaving and fusion splicing of replacement amplifier modules) with much shorter coherence length seed lasers 2 than hitherto possible.

The heater coil 28 may comprise amplifying fibre within one or more of the optical amplifiers 11.

Figure 3:
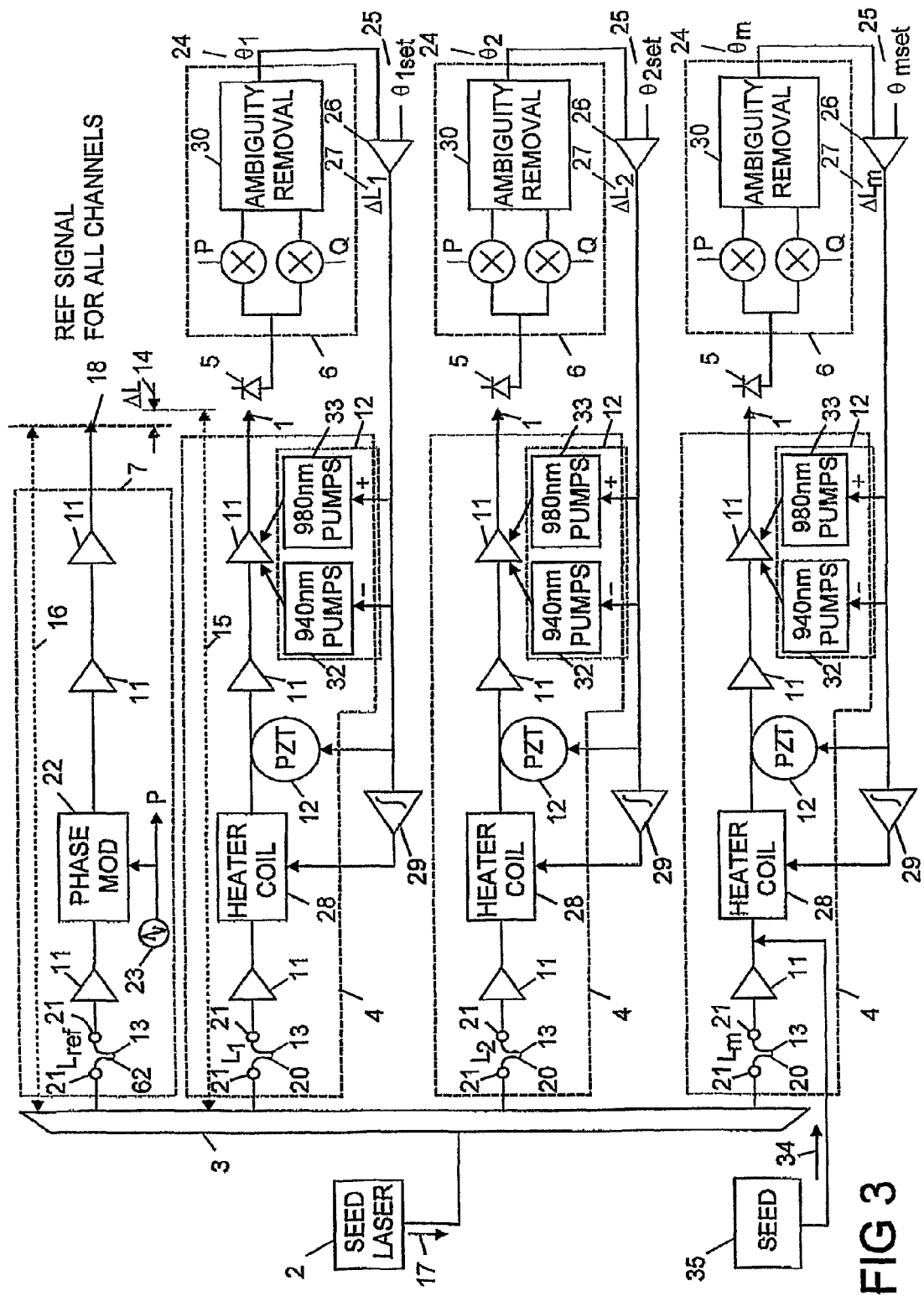
FIG. 3 shows apparatus in which the phase control means utilizes the quantum defect in an optical fibre amplifier.

FIG. 3 shows apparatus in which the phase control means 12 utilizes the quantum defect in an optical fibre amplifier 11. The quantum defect relates to the energy difference between the higher energy pump photon, and the lower energy signal photon released via stimulated emission. The phase control means 12 may be based upon varying the relative proportions of pump power emitted by pumps 32, 33 emitting at different wavelengths. Heat is generated in the amplifiers 11 because the pump power that is used to pump the amplifier 11 has a shorter wavelength (higher energy) than the signal light. Changing the pump wavelength by changing the relative amount of pump power supplied by the pumps 32, 33 of different wavelengths allows the amount of heat being generated by the quantum defect to be controlled. The diagram shows two pumps 32, 33 of 940 nm and 980 nm being operated in antiphase such that if the power from the pump 32 is increased, the power from the pump 33 is decreased to preferably maintain constant output power. These wavelengths are shown for illustration purposes only. It may be better for example to use 940 nm and 960 nm to avoid unpumped lengths of fibre within the amplifier 11 caused by the better pump absorption at 980 nm than at 940 nm. 940 nm and 980 nm are pump wavelengths suitable for Ytterbium and Erbium-Ytterbium doped fibre amplifiers.

FIG. 3 also shows an alternative means of utilizing the quantum defect, namely to use an additional signal 34 (for example at a wavelength of 1100 nm) that can be provided by an additional seed 35, wherein the quantum defect (ie heat generated) upon amplification of the additional signal 34 is different from the quantum defect upon amplification of the optical radiation 17 emitted by the seed laser 2. The additional seed 35 may be a laser such as a laser diode. The additional seed 35 is shown coupling into amplifier channel "m" only for clarity. However, additional seeds 35 are preferably provided in each of the amplifier channels 4. The additional signal 34 may be filtered from the laser radiation 1 at the central wavelength 9 in external optics (not shown) or possibly the atmosphere. For example, the amplifiers 11 may be ytterbium doped fibre amplifiers optimized for emitting the laser radiation 1 with a central wavelength of 1060 nm. If the additional signal 34 has a wavelength of 1100 nm, then amplification by the amplifiers 11 will generate proportionally more wasted heat than equivalent amplification at 1060 nm. This is because the quantum defect is larger. Similarly, if the amplifiers 11 are erbium-ytterbium doped fibre amplifiers emitting at around 1565 nm, then provision of the additional seed 35 emitting at shorter wavelengths (for example 1100 nm or 1550 nm) enables phase control via the quantum defect since the quantum defect is different at these different signal wavelengths. Provision of the additional seed 35 provides a very rapid phase control means 12 with a wide dynamic range. The additional seed 35 can be used in combination with or instead of using the pumps 32, 33 of different wavelengths. The additional seed 35 and the pumps 32, 33 can be used together, and either in combination with, or separately from, the phase control means 12 and the heater coil 28 described with reference to FIGS. 1 and 2.

The demodulator means 6, the ambiguity removal 30, the controller 26, the amplifier 29, and the amplitude control 31 can be configured with analogue electronic circuitry in conjunction with digital circuitry, including microcontrollers, microprocessors and computers. The controller 26 may include electronic memory for dynamic balancing. For example, the controller 26 may store the signals 27 in the electronic memory and use these signals 27 within a prediction estimator (such as a Kalman filter) to assist in reducing overall balancing errors in subsequent operation, for example when the amplifiers 11 are first turned on and are experiencing a thermal ramp. Additionally, the controller 26 may also adjust the path lengths 15 of the amplifier chains 4 via control signals 27 to the phase control means 12 in order to fine tune the path length differences 14. This is advantageous in cases when the coherence length 10 of the seed laser 2 is less than approximately 1 mm since it is difficult to trim the optical fibres 20 to such fine tolerances.

The path length imbalances of the amplifier chains 4 with respect to the reference amplifier chain 7 in the apparatus shown in FIGS. 1 to 3 can be measured by physical length measurements of the fibres. However this is very difficult, especially as fusion splices between the individual fibres of the chains 4 are difficult to make. In addition, small variations in the optical properties of the fibres will render matching of the physical lengths insufficient. Furthermore, with between ten and one hundred amplifier chains 4 (or higher) in a typical system, it is difficult to keep track of the lengths of each chain. Thus it is difficult to replace individual amplifiers and retain the system balance. It is for this reason that the path length balance means 13 are provided at the low power end of the amplifier chains 4 for adjustment.

Each path length difference 14 can be measured using optical methods by measuring the path lengths 15 of each amplifier chain 4 and comparing these with the path length 16 of the reference amplifier chain 7. Optical measurements include measuring time delays, for example with an optical time domain reflectometer or by constructing an oscillator around the chain 4 and measuring the oscillation frequency, or by measuring the lengths with optical instrumentation such as an optical fibre chromatic dispersion instrumentation—available at 1550 nm.

FIG. 4 shows an alternative method to measure the path length difference 48 between the reference amplifier chain 7 and the first amplifier chain 49. An interferometer 41 is inserted between the seed laser 2 and the detection means 5. Conveniently, the interferometer 41 is placed between the seed laser 2 and the splitter 3. The interferometer 41 shown is a Michelson interferometer comprising a beam splitter 42 and two reflectors 43. The interferometer 41 is such that it can be scanned to create an optical path length difference $\Delta L_{int}$ 44, which for a Michelson interferometer is equal to twice the distance d 45 that is moved by one of the reflectors 43. A patch cord 46 of optical path length $L_R$ is inserted into the reference channel 7. The optical path length $L_R$ of the patch cord 46 is preferably greater that the coherence length 10 of the seed laser 2.

FIG. 5 shows an interference signal 51 which is output by the detection means 5 when the interferometer 41 is scanned. The interference signal 51 comprises a central fringe pattern 52, and two side fringe patterns 53, 54. The centres of the two side fringe patterns 55, 56 correspond to the case in which the optical path length difference $\Delta L_{int}$ 44 within the interferometer 41 matches the optical path length difference $\Delta L_1$ 48 in the first amplifier chain 49 with respect to the reference amplifier chain 7. The distance between the centre 57 of the central fringe pattern 52 and the centre 55 of the side fringe pattern 53 is a measure of the optical path length difference 48. Having determined the optical path length difference 48, the optical path lengths 15, 16 of the first amplifier chain 49 and the reference amplifier chain 7 are adjusted such that they are of substantially equal lengths. This adjustment can be achieved by adjusting the optical path length 15 of the first amplifier chain 49 with respect to the optical path length 16 of the reference amplifier chain 16. Removal of the patch cord 46 would make the optical path length difference 48 shorter by the optical path length $L_R$.

It should be noted here that the optical path length difference 48 is measured in air, whereas the optical path length of the first amplifier chair 49 is measured in optical fibre, and accordingly, is longer that its physical path length by the product of the effective refractive index (approximately 1.458) of the optical radiation propagating through the fibre. Thus 10 mm of fibre would be required to balance an optical path length difference $\Delta L_1$ 48 of approximately 14.58 mm.

If prior to adding the patch cord 46, the optical path length 16 is longer than the optical path length 15, then if the patch cord 46 is removed, optical fibre has to be either added to the first amplifier chain 49, removed from the reference amplifier chain 7, or both amplifier chains 7, 49 adjusted in their lengths to make their optical path lengths 15, 16 equal.

If prior to adding the patch cord 46, the optical path length 16 is shorter than the optical path length 15, then if the patch cord 46 is removed, optical fibre has to be either removed from the first amplifier chain 49, added to the reference amplifier chain 7, or both amplifier chains 7, 49 adjusted in their lengths to make their optical path lengths 15, 16 equal.

In the event that the side fringes 53, 54 overlay the central fringe 52, a patch cord 46 having a different optical path length $L_R$ can be used, preferably wherein the length difference is greater than the coherence length of the seed laser 2. Alternatively a different seed laser 2 can be used which has a shorter coherence length. Suitable sources might include light emitting diode sources or amplified spontaneous emission sources. If it is not known which of the amplifier chains 7, 49 is longest, then this can be determined by repeating the above measurement with a patch cord 46 in which the optical path length $L_R$ is different.

The method been described with reference to FIG. 5, in which the side fringes 53, 54 are well separated from the central fringe 52. Although preferable, this is not a requirement. The optical path length difference 14 can be found from the autocorrelation of the interference signal 51, preferably when using a seed laser 2 comprising a broad band source, such as a light emitting diode or a source of amplified spontaneous emission. Techniques and algorithms to determine optical path length differences are described in U.S. Pat. Nos. 5,596,409 and 6,067,161 which are hereby incorporated herein by reference.

Referring back to FIG. 4, the method of determining the path length difference $\Delta L$ 14 has been described with reference to the path length difference $\Delta L_1$ 48 of the first amplifier chain 49. However, it can be performed on each of the amplifier emits 4 of the embodiments described with reference to FIGS. 1 to 3 since each of the detectors 5 can output an interference signal 51 when the interferometer 41 is scanned. The path length difference measurements of each of the amplifier chains 4 of the respective system can be performed simultaneously, sequentially, or iteratively on each of the amplifier chains 4.

Measurements of the channel interference signals 51 from each of the amplifier chains 4 therefore provides information on the respective channel imbalances. The measurements quantify the respective path length differences 14, and allow optical fibres 20 (eg in the form of a patch cord) of the correct lengths to be inserted into, or the equivalent lengths to be removed from, the respective amplifier chains 4. Note the length of the optical fibres 20 in the respective amplifier chains 4 need to be measured (if fitted) and the length of the patch cord 46 fitted into the reference amplifier chain 7 taken into account. This process can be repeated at different output powers and temperatures to verify if the imbalance is the same at each of output power and temperature. The interferometer 41 is preferably removed at the completion of this balancing procedure.

Referring to FIGS. 1 to 3, the path length difference 14 between the plurality of the amplifier chains 4 with respect to the reference amplifier chain 7 can also be balanced by measuring the variation in the phase angle $\theta_i$ 24 output by each of the demodulator means 6 upon applying a phase angle stimulus 60 to the system. The phase angle stimulus 60 is preferably a common stimulus that would be expected to provide substantially the same variation, or a predictably different variation, in the phase angles $\theta_i$ 24 when each amplifier chain 4 is misbalanced by the same amount. Examples of a common stimulus include applying a phase angle modulation to the optical radiation 17 emitted by the seed laser 2, chirping the centre wavelength 9 of the optical radiation 17 emitted by the seed laser 2, and switching on the apparatus shown in FIGS. 1 to 3 such that the amplifiers 11 heat up.

On the assumption that each of the amplifier chains 4 and the reference amplifier chain 7 within any one of the embodiments described with reference to FIGS. 1 to 3 are of similar design, and are designed to have similar warm up characteristics when the apparatus is first switched on, then the path length differences 14 can be tuned by switching the apparatus on, monitoring the phase angle $\theta_i$ 24 output by each of the demodulator means 6, and adjusting the lengths of each of the path length balance means 13 to correct for the respective change in the phase angle $\theta_i$ 24 emitted by the respective detection means 5. The lengths can be adjusted by trial and error, by plotting the phase excursion of each of the phase angles $\theta_i$ 24 as the path length balance means 13 are varied and extrapolating to zero, or by iteration. It is convenient to misbalance the reference amplifier chain 7 by a known amount by inserting or removing a known length of fibre 20 prior to the measurement. The length of fibre 20 should be such that the path length difference 14 is less than the coherence length of the seed laser 2. It may be desirable to increase the coherence length 10 of the seed laser 2 prior to these measurements, for example, by using a laser with a longer coherence length 10.

Referring to FIG. 1, a path length difference 14 can be introduced by inserting an optical fibre 62 of length $L_{REF}=L_{REF\_A}$ into the reference amplifier chain 7. A phase angle stimulus 60 applied to the apparatus will cause a phase variation in each of the amplifier chains 4 and the reference amplifier chain 7. These variations will be different if the introduction of the optical fibre 62 of length $L_{REF\_A}$ into the reference amplifier chain 7 resulted in the optical path lengths 15 and 16 being different from each other in the respective amplifier chain 4. Upon interference of the laser radiation 1 with the laser radiation 18 on each of the detectors 5, each of the demodulator means 6 will output a phase angle $\theta_{i,1}$ 24 after a time T 61 shown with reference to FIG. 6. Here the "i" subscript refers to the amplifier chain 4, and the "1" subscript refers to length $L_{REF\_A}$. Phase angle $\theta_{1,1}$ 63 (for amplifier chain number 1) and the time T 61 are shown with reference to FIG. 6. A different path length difference 14 can be introduced by inserting an optical fibre 62 of a length $L_{REF}=L_{REF\_B}$ into the reference amplifier chain 7. The same phase angle stimulus 60 applied to the apparatus will now cause a different phase variation in each of the amplifier chains 4 because the path length difference 14 has been altered. Upon interference of the laser radiation 1 with the laser radiation 18 on each of the detectors 5, each of the demodulator means 6 will output a phase angle $\theta_{i,2}$ 24. Here the "i" subscript refers to the i$^{th}$ amplifier chain 4, and the "2" subscript refers to length $L_{REF\_B}$. Here the phase angles $\theta_{i,1}$ and $\theta_{i,2}$ are the phase angle variations following the introduction of the phase angle stimulus 60. Incorporation of the ambiguity removal 30 within the demodulator means 6 makes the phase angle variations easier to measure.

The phase angle stimulus 60 is shown as being input into the seed laser 2. The phase angle stimulus 60 may be a frequency chirp, for example as a result of the seed laser 2 heating up after being switched on. The phase angle stimulus 60 may be achieved by switching the entire apparatus shown in FIG. 1 on, or parts thereof, such as one of the amplifiers 11 in the amplifier chains 4, 7. It is preferable that the same phase angle stimulus 60 is applied to each of the amplifier chains 4, 7.

Figure 6:
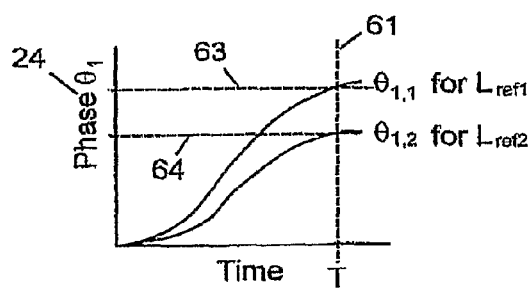
FIG. 6 shows the output of the demodulator means after application of a phase angle stimulus.

The phase angle $\theta_{1,1}$ 63 (for amplifier chain number 1 with $L_{REF}=L_{REF\_A}$), phase angle $\theta_{1,2}$ 64 (for amplifier chain number 1 with $L_{REF}=L_{REF\_B}$), and the time T 61 are shown with reference to FIG. 6. Noting that the total phase excursion will be proportional to the total length mismatch allows the original path length difference 14 to be calculated. The length 15 of the first (i=1) amplifier chain 4 should be adjusted by a fibre length $\Delta L_1$ given by;

$$\Delta L_1 = (\theta_{1,1} \cdot L_{REF\_B} - \theta_{1,2} \cdot L_{REF\_A})/(\theta_{1,1} - \theta_{1,2}) \quad (1)$$

where $\Delta L_1$ is the fibre length by which the first (i=1) amplifier chain 4 is longer than the length of the reference amplifier chain 7 after removing the optical fibre 62 of length $L_{REF}$ in the reference amplifier chain 7 and connecting the fibres in the reference amplifier chain 7 together again. Thus if the optical fibre 62 is removed and the fibres reconnected, then the optical path length 15 should be shortened by a fibre length $\Delta L_1$. In terms of the sign of $\Delta L_1$, if $\Delta L_1 > 0$, then the optical path length 15 should be shortened by $\Delta L_1$, and if $\Delta L_1 < 0$, then the optical path length 15 should be lengthened by $-\Delta L_1$.

Advantageously, each of the demodulator means 6 in each of the "m" amplifier chains 4 will output a phase angle $\theta_{i,1}$ 24 for length $L_{REF}=L_{REF\_A}$ and a phase angle $\theta_{i,2}$ 24 for length $L_{REF}=L_{REF\_B}$ when performing the above procedure. Thus the length of the i$^{th}$ amplifier chain 4 should be adjusted by a fibre length $\Delta L_i$ given by:

$$\Delta L_i = (\theta_{i,1} \cdot L_{REF\_B} - \theta_{i,2} \cdot L_{REF\_A})/(\theta_{i,1} - \theta_{i,2}) \quad (2)$$

where as before, the length of the i$^{th}$ amplifier chain 4 is shortened by $\Delta L_i$ when $\Delta L_i > 0$, and lengthened by $\Delta L_i$ when $\Delta L_i < 0$. Although it is preferable to measure each of the $\Delta L_i$ by varying the length of the optical fibre 62 as described above, the method would also work by varying the lengths of the optical fibres 20 in each of the amplifier chains 4.

The lengthening and shortening of the amplifier chains 4 can be achieved by adding or removing lengths $\Delta L_1$ from the path length balance means 13. This can be conveniently be achieved using the optical fibres 20, which may be fusion spliced directly into the system, or connected using the optical connectors 21.

The lengths $\Delta L_i$ can alternatively or additionally be determined by trial and error, by plotting the phase excursions $\theta_1$ 24 following the phase angle stimulus 60 as the optical fibres 20 and or 62 are varied in length and extrapolating to zero, or by iteration.

This aspect of the invention can thus be considered to be a self-calibrating, coherently combined, laser system, or a method to balance a coherently combined laser system. This can be implemented in any of the embodiments shown in FIGS. 1 to 4. Further, the techniques for measuring and balancing the amplifying channels 4 can be applied independently or in series.

The passive and active balancing methods may provide different results for the lengths of the optical fibres 20. This is because variations will also depend upon the heat sinking and thermal energy removal of each amplifier 11. It is therefore preferable that the embodiments described with reference to FIGS. 1 to 4 contain ways to tune both the heat sinking and the cooling rates of the amplifiers 11, by for example, applying some form of restriction to water or air flow in the system.

The embodiments described with reference to FIGS. 1 to 4 may operate in a similar way each time they are turned on. Modern control techniques that use a system model contained within an estimator (such as a Kalman filter) can be incorporated into the system. Alternatively or additionally, the system can "learn" with past operation history being used to assist in dynamic balancing of both phase and amplitude.

The demodulator means 6 can be a phase angle demodulator and will likely comprise a mixture of analogue and digital circuitry. The demodulator means 6 can be a digital radio demodulator. Preferably the signal from the detection means 5 is limited prior to demodulation. Signal limiters can be implemented using electronic comparators. Ambiguity removal is preferably performed using digital signal processors. Examples of demodulation techniques can be found in U.S. Pat. No. 6,363,034: "Methods and apparatus for phase angle demodulation".

Figure 7:
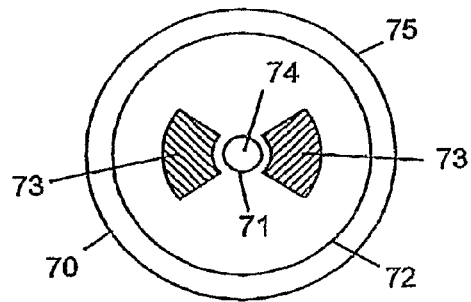
FIG. 7 shows a polarisation maintaining optical fibre.

The amplifier chains 4 preferably comprises a polarisation maintaining fibre 70 as shown with reference to FIG. 7. The polarisation maintaining fibre 70 shown in FIG. 7 is a bow-tie fibre, comprising a core 71, at least one cladding 72, and at least one stress applying part 73. Alternative polarisation maintaining fibres include elliptical core, elliptical jacket, and fibres containing longitudinally extending stress rods on either side of the core 71. The core 71 may be doped with a rare earth dopant 74. The rare earth dopant 74 may comprise at least one of ytterbium, erbium, neodymium, praseodymium, thulium, samarium, holmium, europium, terbium, and dysprosium. The fibre 70 would normally be coated with a mating 75, which can be a glass, or a polymer. The core 71 and the cladding 72 may be solid, or may be microstructured. The optical fibres 20, 46, and 62 are preferably polarisation maintaining fibres. The splitter 3 is preferably a polarisation maintaining coupler. The splitter 3 may comprise polarisation maintaining fibre. Alternatively or additionally, the splitter 3 may comprise planar waveguides.

Figure 8:
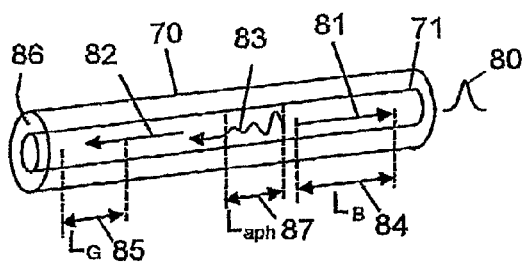
FIG. 8 shows stimulated Brillouin scattering in an optical fibre.

As depicted in FIG. 8, the polarisation maintaining fibre 70 is preferably a large mode area fibre that supports a fundamental mode 80 having a large effective area $A_{eff}$. By "large effective area", it is meant at least twice the effective mode area of a typical fibre used in telecommunication applications. Increasing the effective area $A_{eff}$ (not shown) of an optical fibre reduces the optical intensity for the same optical power propagating along the fibre. Consequently, the power levels at which non-linear effects (the so-called non-linear thresholds) become important increases. The effective area $A_{eff}$ should be at least approximately 100 µm², preferably at least approximately 500 µm², and more preferably at least 2500 µm². Example fibres are disclosed in U.S. Pat. No. 7,120,339.

Figure 9:
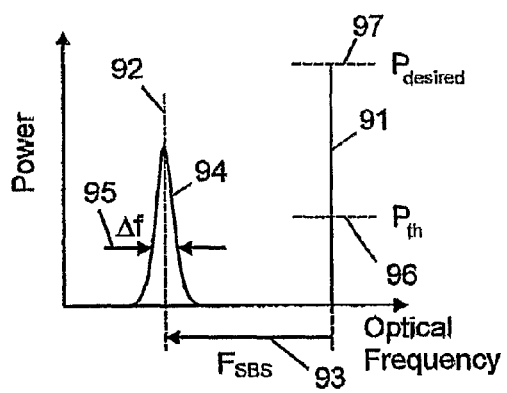
FIG. 9 shows optical frequencies associated with stimulated Brillouin scattering.

As shown with reference to FIGS. 8 and 9, stimulated Brillouin scattering SBS in an optical fibre 70 is characterized by a frequency shift $F_{SBS}$ 93 between the optical frequency 91 of a forward propagating pump wave 81 and the mean frequency 92 of a backward travelling wave 82. The frequency shift $F_{SBS}$ 93 of the backward travelling wave 82 compared to the forward travelling wave 81 at a pump wavelength of around 1 µm is typically around 10 GHz to 17 GHz in silica optical fibres, the variation being dependent upon dopants and whether the fibre has a solid uniform, a solid non-uniform core, or is microstructured. The backward travelling wave 82 experiences an SBS gain 94 having a bandwidth ΔF 95 in the range 35 MHz to 100 MHz. This bandwidth 95 corresponds to the lifetime of the acoustic phonon 83 that is generated in the spontaneous Brillouin scattering process and is the optical gain bandwidth of the stimulated Brillouin scattering process. The lifetime of the acoustic phonon 83 is typically less than 10 ns. This bandwidth ΔF 95 corresponds to an effective Brillouin scattering length $L_B$ 84 of optical fibre of around 2 m. The length $L_B$ 84 corresponds to the distance that the forward propagating wave 81 (ie the pump wave) at low powers would propagate along the fibre 70 in the lifetime of the acoustic phonon 83. The corresponding distance $L_{aph}$ 87 that the acoustic phonon 83 would propagate is of the order 10 µm.

The SBS threshold $P_{th}$ 96 is the power level at which SBS effects become noticeable. There are various definitions of the SBS threshold 96. A practical definition is that the SBS threshold 96 is the power level of the forward travelling pump wave 81 at which the power of the backward travelling wave 82 is 1% of the power of the forward travelling pump wave 81, as measured at the fibre input 86. For the systems of interest, the SBS threshold 96 when using a narrowband source as the seed laser 2 has a power less than the desired output power $P_{desired}$ 97 of the optical radiation 1 emitted by the amplifier chains 4. The following equation is often used for telecom systems:

$$P_{th} = 21 \cdot \frac{K_{SBS} \cdot A_{eff}}{g_{SBS} \cdot L_{eff}} \quad (3)$$

where $P_{th}$ is the SUS threshold 96, $A_{eff}$ is the effective area of the signal power, $g_{SBS}$ is the peak of the SBS gain, and $K_{SBS}$ is the polarization factor. For silica fibres, the gain $g_{SBS}$=5×10⁻¹¹ m/W. $K_{SBS}$ is equal to 1 if the pump and Brillouin signal are aligned in polarization, is equal to 1.5 if the polarization is scrambled, and is equal to 2 if the light is unpolarized. $L_{eff}$ is the effective length of the fibre over which SBS threshold 96 is achieved. It is related to the length L of fibre, and the fibre attenuation α:

$$L_{eff} = L \cdot \frac{[1 - \exp(-\alpha \cdot L)]}{\alpha} \quad (4)$$

Equation (3) can be used to calculate $L_{eff}$ corresponding to an SBS threshold 96 of 1 kW. Assuming a silica doped fibre in which the fundamental mode is polarized and has an effective area $A_{eff}$ of 100 µm², it is found that $L_{eff}$ is approximately 40 mm. Here it has been assumed that $g_{SBS}$=5×10⁻¹¹ m/W and $K_{SBS}$ is equal to 1. However, the 40 mm figure his been calculated without considering the effect of optical gain in the fibre.

An alternative approach applicable for fibres having optical gain, is to define an effective Brillouin gain length $L_G$ 85 as the physical length of fibre required to reach the SBS threshold 96. In this case, $L_G$ is approximately half $L_{eff}$. This factor of one half can alternatively be viewed as a safety factor which is useful to ensure that an SBS event, usually experienced as a high energy pulse propagating in the backwards direction that destroys the fibre, does not occur. Thus a 1 µm an wavelength laser having a large mode area core of approximately 100 µm² in a silica based fibre, and having an optical power of 1 kW, would have an effective Brillouin gain length $L_G$ 85 of approximately 20 mm. That is a fibre length of 20 mm is all that is required to reach the SBS threshold 96.

It should be noted that 20 mm is significantly less than the Brillouin scattering length $L_B$ 84 of around 2 m. For the line broadening techniques to mitigate this problem would require the seed laser 2 (which provides the pump wave 81 of optical frequency 91) to have a coherence length 10 (shown with reference to FIG. 1) of at least 20 mm in fibre, which corresponds to approximately 30 mm in air. Thus from Table 1, the seed laser 2 would need to have a bandwidth δf 8 (shown with reference to FIG. 1) of approximately 10 GHz. Given that the embodiments shown with reference to FIGS. 1 to 4 and Table 1 required balancing within the coherence length 10, and preferably well within the coherence length 10, this implies balancing to approximately 1 mm which is extremely difficult. The new balancing techniques described with reference to FIGS. 1 to 4 are therefore important at these power levels, especially when balancing to less than $\frac{1}{3}^{rd}$ or preferably less than $\frac{1}{10}^{th}$ of the coherence length 10 (shown with reference to FIG. 1).

Figure 10:
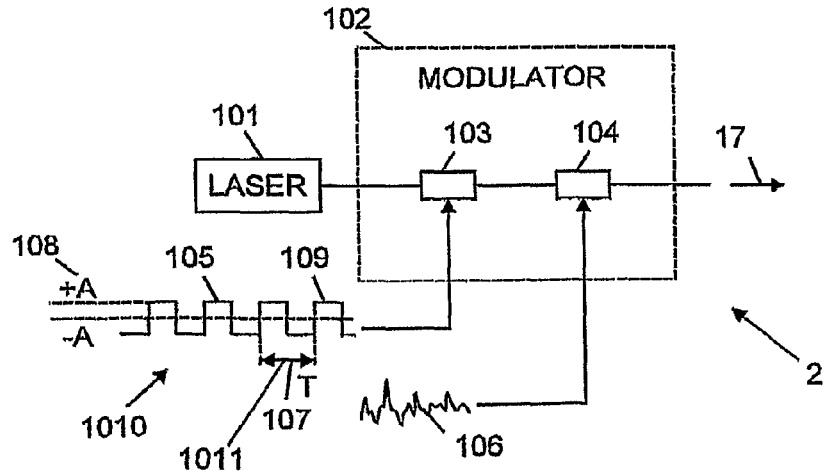
FIG. 10 shows a seed laser comprising a narrow linewidth laser and a modulator.

The seed laser 2 of FIGS. 1 to 4 can comprise a narrow linewidth laser 101 and a modulator 102 as shown with reference to FIG. 10. The narrow linewidth laser 101 can comprise a DFB fibre laser or a semiconductor DFB laser. Alternatively, the narrow linewidth laser 101 can comprise a spectrally sliced ASE source. The modulator 102 can comprise a first and a second phase modulator 103, 104. The modulator 102 can be driven with a first phase modulating signal 105 which is shown as being a period signal 109. The periodic signal 109 is characterised by a period T 107, which can alternatively be described as a frequency 1010 equal to 1/period T 107, or a wavelength 1011 which is conveniently defined with respect to the optical radiation 17 propagating within the optical fibre 70 of the amplifiers 11. The wavelength 1011 is numerically equal to the period T 107 multiplied by the speed of light of the optical radiation 17 within an optical amplifier 11. The period T 107 can be uniform or may be time varying.

The modulator 102 may be driven with a second phase modulating signal 106, which is shown as being a random or a pseudo-random signal, which may be applied in addition to or instead of the first phase modulating signal 105. The first phase modulating signal 105 is shown as being a periodic signal 109 which is applied to the first phase modulator 103. The second phase modulating signal 106 is shown as being a random signal being applied to the second phase modulator 104. Alternatively, the first phase modulating signal 105 and the second phase modulating signal 106 can be added or synthesized electronically, and applied to the first phase modulator 103, the second phase modulator 104, or both first and second phase modulators 103, 104. By "phase modulator", it is meant any modulator that modulates the phase of the optical radiation 17 emitted by the seed laser 2. Instantaneous frequency is the derivative of phase with respect to time. Thus the term "phase modulator" is meant to include a frequency modulator, including ones based on integrated optics, serrodyne frequency shifters, and acousto-optic modulators. The first and the second phase modulators 103, 104 can be an integrated optic modulator for fast phase modulation (greater than around 1 MHz) low amplitude (less then $2\pi$), or a PZT modulator for low frequency (less than 1 MHz) high amplitude (greater than $2\pi$) modulation.

The first phase modulating signal 105 may be a periodic signal comprising sinusoidal, triangular, saw tooth, or square waveforms.

Figure 12:
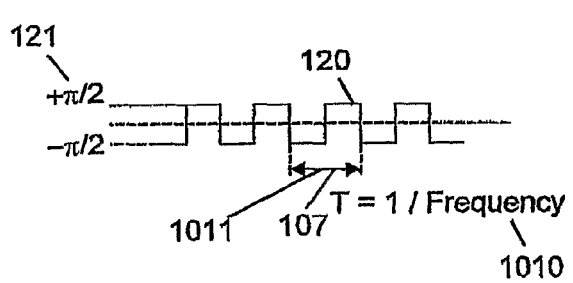
FIG. 12 shows a phase shift keying signal.

The first phase modulating signal 105 may be a phase shift keying (PSK) signal 120 as shown with reference to FIG. 12. More exactly, application of the PSK signal 120 to the phase modulator 102 results in the optical radiation 17 emitted by the seed laser 2 being PSK modulated. Preferably, the PSK signal 120 has an amplitude 121 of approximately $\pi/2$, but can also be approximately $3\pi/2$, or approximately $5\pi/2$. The frequency 1010 (equal to 1/period T 107 of the signal 120) is preferably at least greater than approximately the product of the Brillouin bandwidth $\Delta f$ 95 and the length $L_B$ 84 divided by the length $L_G$ 85. For the 1 kW example described previously, this would correspond to approximately 5 GHz to 100 Hz, the exact value depending on the dopant materials within the fibres and the structure of the fibres.

Figure 13:
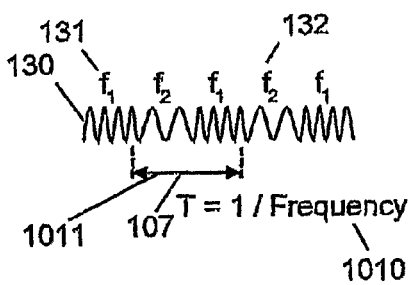
FIG. 13 shows a coherent phase frequency shift keying signal.

The phase modulator 102 may be a continuous phase frequency shift keying (CPFSK) modulator, and the first phase modulating signal 105 may be a continuous phase frequency shift keying (CPFSK) signal 130 as shown with reference to FIG. 13. The CPFSK modulator can be a frequency shifter, such as an integrated optic frequency shifter or a serrodyne frequency shifter, which shifts the optical frequency of optical radiation. The CPFSK signal 130 when applied to the phase modulator 102 shifts the optical frequency of the optical radiation 17 alternately by the frequency shifts $f_1$ 131 and $f_2$ 132, with a smooth transition in phase between the two frequencies 131, 132. The repetition frequency 1010 (equal to 1/period T 107 of the signal 130) is preferably at least greater than approximately the product of the Brillouin bandwidth $\Delta f$ 95 and the length $L_B$ 84 divided by the length $L_G$ 85. For the 1 kW example described previously, this would correspond to approximately 5 GHz to 10 GHz. Preferably, the difference in the frequency shifts 131, 132 is greater than the Brillouin bandwidth $\Delta f$ 95, that is $f_1-f_2 > \Delta f$, and the frequency shifts 131, 132 should be at least twice the product of the Brillouin bandwidth $\Delta f$ 95 and the length $L_B$ 84 divided by the length $L_G$ 85.

Figure 11:
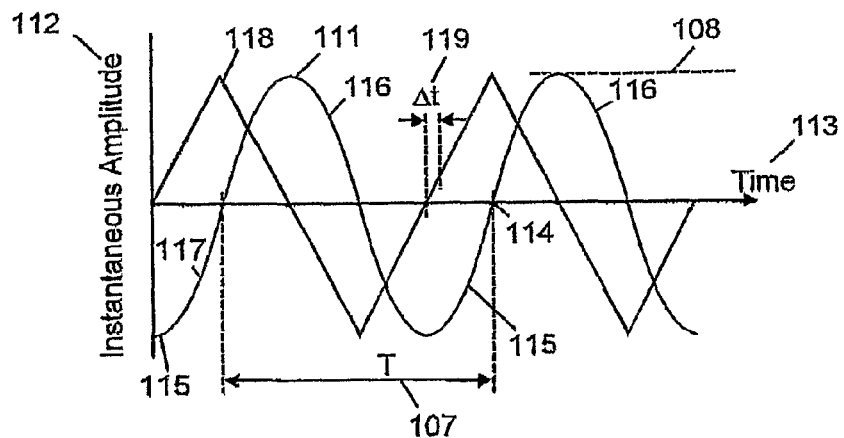
FIG. 11 shows a parabolic waveform.

The first phase modulating signal 105 may be a periodic signal comprising a parabolic waveform 111, as shown with reference to FIG. 11. The parabolic waveform 111 is shown comprising a central parabola 117 having an instantaneous amplitude y(t) 112 dependence on time 113 of $$y(t)=16 \cdot t^2/T^2-1 \qquad (5)$$

where T is the period 107. The parabolic waveform 111 is shown as repeating itself with positive cycles 115 and negative cycles 116. However the parabolic waveform 111 can alternatively repeat itself with only positive cycles 115, or with only negative cycles 116.

The instantaneous frequency 118 of the parabolic waveform 111 has a piecewise linear fashion as shown in FIG. 11. Thus although the parabolic waveform 111 resembles a sinusoidal wave, it is fundamentally different, because the slope of a sinusoidal wave is still sinusoidal. The disadvantage of such a sinusoidal wave is that its instantaneous frequency does not vary substantially when the phase is varying maximally at the zero crossings. The parabolic waveform 111 retains rapid variation in instantaneous frequency 118 even at the zero crossings 114, and is thus better able to mitigate stimulated Brillouin scattering by continuously detuning the laser 101. Preferably, the instantaneous frequency 118 varies by more than the Brillouin bandwidth 95 over a time $\Delta t$ 119 corresponding to the time taken for the pump light 81 to propagate the distance $L_G$ 85. Preferably the period T 107 is at least equal to the product of the time $\Delta t$ 119 and the desired output power 97 (shown with reference to FIG. 9) divided by the SBS threshold 96 of the unmodulated narrow linewidth laser 101.

The desired instantaneous frequency 118 characteristics can be provided by applying the parabolic waveform 111 to a PZT phase modulator, such as the phase control means 12 in the form of the PZT modulator described with reference to FIG. 1. The parabolic waveform 111 can be synthesized from its Fourier series components with one or more PZT modulators. Alternatively, the desired instantaneous frequency 118 characteristics can be provided using a frequency modulator such as a serrodyne frequency shifter, integrated optic frequency shifters, and acousto-optic modulators. These latter frequency shifters may be capable of providing a wider range of frequency shifts than obtainable with a PZT modulator.

Referring to FIG. 10, the first phase modulating signal 105 is shown as a periodic signal 109 having a frequency 1010 and an amplitude A 108. The periodic signal 109 may comprise a sinusoidal, a triangular, a saw tooth, or a square waveform. The frequency 1010 is preferably greater than the Brillouin bandwidth $\Delta F$ 95. Alternatively, or additionally, the amplitude A 108 can be greater than $\pi$ radians. Preferably the amplitude 108 is greater than $10\pi$ radians. Alternatively or additionally, the product of the amplitude 108 and the frequency 1010 is greater than 1 GHz. For a sinusoidal signal, the product of the amplitude 108 and the frequency 1010 is preferably less than the frequency shift $F_{SBS}$ 93 (shown with reference to FIG. 9). This is to ensure that there is no frequency component in the optical radiation 17 at the frequency shift $F_{SBS}$ 93. If there were, then Rayleigh backscattering or specular reflections (from fibre end faces, fusion splices, lenses, etc) would result in seeding stimulated Brillouin scattering, which seeding is undesirable.

Figure 14:
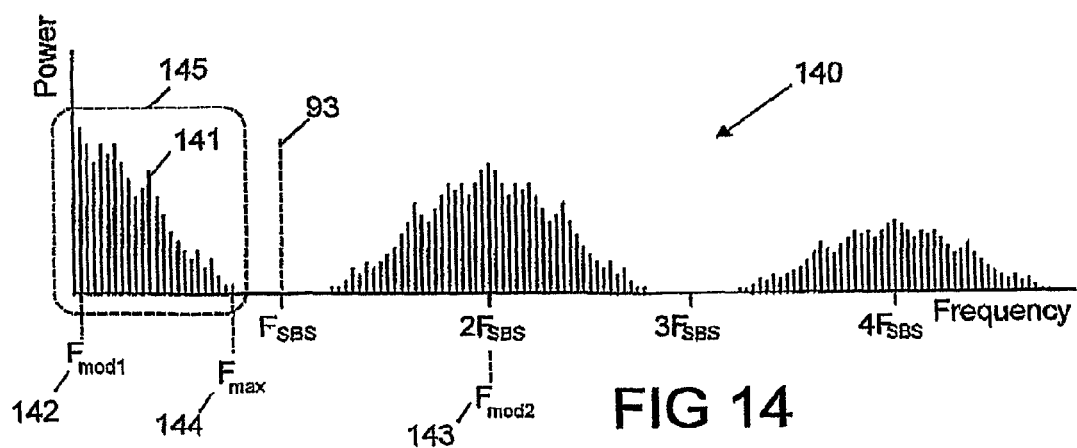
FIG. 14 shows a power spectrum of optical radiation broadened by phase m modulation.

FIG. 14 shows a power spectrum 140 containing a baseband spectrum 145 having a maximum frequency deviation $F_{max}$ 144. The baseband spectrum 145 can be obtained by applying the first phase modulating signal 105 to the rust phase modulator 103. The first phase modulating signal 105 can comprise a periodic signal, a random signal, or a pseudo-random signal, alone or in combination. The baseband spectrum 145 can be obtained when a periodic signal having a frequency 1010 equal to $F_{mod1}$ 142 is applied to the first phase modulator 103. The baseband spectrum 145 is shown as comprising harmonics 141 of the frequency 1010. If instead the first phase modulating signal 105 were a random or a pseudo-random signal, the baseband spectrum 145 would be continuously varying up to a maximum frequency deviation $F_{max}$ 144 which is preferably less than the frequency shift $F_{SBS}$ 93. Returning to the case when the first phase modulating signal 105 is a periodic signal, the amplitude 108 and the frequency 142 are preferably such that the maximum frequency deviation $F_{max}$ 144 obtained in the phase modulation process is less than the frequency shift $F_{SBS}$ 93. For a sinusoidal phase modulation, the maximum frequency deviation 144 is given by the product of the amplitude 108 (measured in radians) and the frequency 142. For the parabolic waveform modulation 111, the maximum frequency deviation 144 is given by the product of the amplitude 108 (measured in radians) and the frequency 142 multiplied by $4/\pi$ (which is approximately 1.27). Note that it is undesirable that the power spectrum 145 contains a frequency component at the frequency shift $F_{SBS}$ 93, because Rayleigh backscattering and unwanted reflections would result in light with this frequency shift being reflected back through the system, which light would experience gain due to stimulated Brillouin scattering.

The spectrum 145, or an equivalent spectrum from a seed laser having a broad linewidth, can be significantly broadened by applying the second phase modulating signal 106 to the second phase modulator 104. The second phase modulating signal 106 can be a second periodic signal having a frequency 1010 equal to a second modulation frequency $F_{mod2}$ 143 which is preferably selected such that there are no significant signal components in the power spectrum 140 at the stimulated Brillouin frequency shift $F_{SBS}$ 93. Preferably the second modulation frequency $F_{mod2}$ 143 is approximately at least twice the stimulated Brillouin frequency shift $F_{SBS}$ 93. Such a combined modulation will result in significant broadening of the bandwidth δf 8 of the seed laser 2. The second periodic signal can be a sinusoidal signal, a squarewave signal, a triangular signal, or the parabolic waveform 111. The second periodic signal can be the PSK modulation 120 or the CPFSK modulation 130. The second phase modulating signal 106 can be a periodic signal having a wavelength 1011 less than the effective Brillouin gain length $L_G$ 85. Preferably the wavelength 1011 is less than one half, and preferably less than one quarter, of the effective Brillouin gain length. $L_G$ 85. Significantly, even though the bandwidth δf 8 of the seed laser 2 when modulated by these signals is very much greater than stimulated Brillouin frequency shift $F_{SBS}$ 93, the embodiments described with reference to FIGS. 1 to 4 can still be balanced by the methods described herein.

The apparatus and in particular the optical radiation 17 can be such that the effective Brillouin gain length $L_G$ 85 is comparable or less than the effective Brillouin scattering length $L_B$ 84. As explained above, this is likely to occur at power levels of approximately 1 kW, but may also occur at power levels greater than around 100 W. The first phase modulating signal 105 can be a first periodic signal having a wavelength 1011 less than the effective Brillouin gain length $L_G$ 85. Preferably the wavelength 1011 is less than one half, and preferably less than one quarter, of the effective Brillouin gain length $L_G$ 85. As noted above, for a 1 kW signal power, this leads to a requirement for the fundamental frequency 1010 to be of the order 10 GHz, which is comparable to the Brillouin frequency shift $F_{SBS}$ 93 in some optical fibres. Having the frequency 1010 equal to the Brillouin frequency shift $F_{SBS}$ 93 can lead to increased stimulated Brillouin scattering, seeded by optical radiation that is reflected by Rayleigh scattering or by specular reflections. Consequently, it is preferred that the fundamental frequency 1010 of the periodic signal 109 is selected such that no harmonic or frequency component of the frequency 1010 is substantially equal to the Brillouin frequency shift $F_{SBS}$ 93. The frequency 1010 of the first phase modulating signal 105 can be greater than the Brillouin frequency shift $F_{SBS}$ 93. For example, the first phase modulation may be a phase shift keyed PSK signal 120 having a frequency 1010 of 40 GHz. This will result in several phase cycles within the Brillouin gain length $L_G$ 85 causing reduction in the build up of the stimulated Brillouin scattering. The overall system can still be balanced while applying the PSK signal 120 if the linewidth of the unmodulated laser 101 within the seed laser 2 is sufficiently narrow. This is because as the path length 15 is unbalanced, the interference signals will have an envelope that extends over the coherence length 10 of the unmodulated seed laser 101. Alternatively, the seed laser 2 can be temporarily replaced by another source whilst balancing the system. Thus the techniques to balance the embodiments described with reference to FIGS. 1 to 4 can still be used.

The phage modulation broadening techniques described with reference to FIGS. 8 to 14 can be used in conjunction with the embodiments described with reference to FIGS. 1 to 4. Importantly, the resulting phase noise in an unbalanced interferometer obtained by broadening the bandwidth δf 8 of the seed laser 2 as described with reference to FIG. 10 may be significantly better in such a system than with using a seed laser 2 which is not broadened and which has an equal effective bandwidth δf 8 (ie 10 GHz to 40 GHz or more). By unbalanced, it is meant that the path lengths 15,16 shown with reference to FIGS. 1 to 4 are not completely the same, but are preferably well within the coherence length 10 of the seed laser 2.

It is to be appreciated that the embodiments of the invention described above with reference to the accompanying drawings have been given by way of example only and that modifications and additional components may be provided to enhance performance. The present invention extends to the above-mentioned features taken in isolation or in any combination.

The invention claimed is:

1. Apparatus for combining laser radiation, which apparatus comprises a seed laser, a splitter, a plurality of amplifier chains, a reference amplifier chain, detection means, demodulator means, and phase control means, wherein each of the amplifier chains comprises at least one optical amplifier, optical radiation emitted from the seed laser is split into the plurality of amplifier chains by the splitter, amplified by the plurality of amplifier chains, interfered, detected by the detection means, demodulated by the demodulator means, and signals indicative of path length imbalance fed back to the phase control means, and wherein the apparatus is characterized in that the output power emitted by each amplifier chain is at least 50 W, the bandwidth of the seed laser is at least 1 GHz, and the path length difference between each amplifier chain and the reference amplifier chain is less than the coherence length of the seed laser.

2. Apparatus according to claim 1 wherein the phase control means utilizes the quantum defect in an optical fibre amplifier.

3. Apparatus according to claim 2 wherein the phase control means is based upon varying the relative proportions of pump power emitted by a longer wavelength pump and a shorter wavelength pump.

4. Apparatus according to claim 2 wherein the phase control means utilizes an additional signal wavelength that is different from the signal wavelength emitted by the seed laser.

5. Apparatus according to claim 1 and including a scanning interferometer between the seed laser and the splitter for measuring the path length difference between each of the plurality of amplifier chains and the reference amplifier chain.

6. Apparatus according to claim 1, wherein the seed laser comprises a modulator comprising at least one phase modulator.

7. Apparatus according to claim 6 wherein the modulator is driven with a periodic signal.

8. Apparatus according to claim 7 wherein the periodic signal comprises a parabolic waveform.

9. Apparatus according to claim 7 wherein the frequency of the periodic signal is greater than the Brillouin bandwidth.

10. Apparatus according to claim 7 wherein the amplitude of the periodic signal is greater than $\pi$ radians.

11. Apparatus according to claim 10 wherein the amplitude is greater than $10\pi$ radians.

12. Apparatus according to claim 7 wherein the product of the amplitude and the frequency of the periodic signal is greater than 1 GHz.

13. Apparatus according to claim 12 wherein product of the amplitude of the periodic signal and the frequency of the periodic signal is less than the stimulated Brillouin frequency shift.

14. Apparatus according to claim 7 wherein the modulator is driven with a second periodic signal having a frequency greater than the stimulated Brillouin frequency shift.

15. Apparatus according to claim 14 wherein the frequency of the second periodic signal is more than approximately twice the stimulated Brillouin frequency shift.

16. Apparatus according to claim 14 wherein the second periodic signal is a phase shift keying signal.

17. Apparatus according to claim 7 wherein at least one of the amplifier chains is characterized by an effective Brillouin gain length and an effective Brillouin scattering length, and the optical power emitted by the amplifier chain is such that the effective Brillouin gain length is comparable or less than the effective Brillouin scattering length.

18. Apparatus according to claim 17 wherein the periodic signal is characterized by a wavelength, and the wavelength of the periodic signal is less than the effective Brillouin gain length.

19. Apparatus according to claim 18 wherein the wavelength of the periodic signal is less than one half of the effective Brillouin gain length.

20. Apparatus according to claim 6 wherein the modulator is driven with a random or a pseudo-random signal having a bandwidth less than the stimulated Brillouin frequency shift.

21. Apparatus according to claim 6 wherein the modulator is driven with a phase shift keying signal.

22. Apparatus according to claim 6 wherein the modulator is driven with a continuous phase frequency shift keying signal.

23. A method of balancing apparatus, which apparatus comprises a seed laser, a splitter, a plurality of amplifier chains, a reference amplifier chain, detection means, demodulator means, and phase control means, wherein each of the amplifier chains comprises at least one optical amplifier, optical radiation emitted from the seed laser is split into the plurality of amplifier chains by the splitter, amplified by the plurality of amplifier chains, interfered, detected by the detection means, demodulated by the demodulator means, and signals indicative of path length imbalance fed back to the phase control means, and wherein the apparatus is characterized in that the output power emitted by each amplifier chain is at least 50 W, the bandwidth of the seed laser is at least 1 GHz, and the path length difference between each amplifier chain and the reference amplifier chain is less than the coherence length of the seed laser, which method comprises applying a phase angle stimulus, to the apparatus, and measuring the path length imbalance between at least one of the amplifier chains and the reference amplifier chain from the signals indicative of path length imbalance.

24. A method according to claim 23 comprising an additional step of misbalancing the reference amplifier chain.

25. A method according to claim 23 comprising an additional step of misbalancing at least one of the amplifier chains.

26. A method of balancing apparatus, which apparatus comprises a seed laser, a splitter, a plurality of amplifier chains, a reference amplifier chain, detection means, demodulator means, and phase control means, wherein each of the amplifier chains comprises at least one optical amplifier, optical radiation emitted from the seed laser is split into the plurality of amplifier chains by the splitter, amplified by the plurality of amplifier chains, interfered, detected by the detection means, demodulated by the demodulator means, and signals indicative of path length imbalance fed back to the phase control means, and wherein the apparatus is characterized in that the output power emitted by each amplifier chain is at least 50 W, the bandwidth of the seed laser is at least 1 GHz, and the path length difference between each amplifier chain and the reference amplifier chain is less than the coherence length of the seed laser, which method comprises, providing an interferometer, inserting the interferometer between the seed laser and the splitter, scanning the interferometer, and measuring the path length imbalance between at least one of the amplifier chains and the reference amplifier chain from the signals indicative of path length imbalance.

27. A method according to claim 26 comprising an additional step of misbalancing the reference amplifier chain.

28. A method according to claim 26 comprising an additional step of misbalancing at least one of the amplifier chains.

* * * * *